US008290135B2

(12) United States Patent
Oliver et al.

(10) Patent No.: US 8,290,135 B2
(45) Date of Patent: Oct. 16, 2012

(54) SYSTEMS AND METHODS FOR FACILITATING CONFERENCE CALLS USING SECURITY KEYS

(75) Inventors: Brian Oliver, Waterloo (CA); Ian McDonald, Waterloo (CA); Douglas Gisby, Redwood City, CA (US); Christopher Labrador, Waterloo (CA); Michael McAndrews, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 648 days.

(21) Appl. No.: 12/394,164

(22) Filed: Feb. 27, 2009

(65) Prior Publication Data

US 2010/0220845 A1 Sep. 2, 2010

(51) Int. Cl.
H04M 3/42 (2006.01)
(52) U.S. Cl. ............................. 379/202.01; 379/201.01
(58) Field of Classification Search ............. 379/201.01, 379/202.01
See application file for complete search history.

(56) References Cited

U.S. PATENT DOCUMENTS

| 5,003,593 | A | 3/1991 | Mihm, Jr. |
| 6,813,714 | B1 * | 11/2004 | Hardjono et al. ............... 726/14 |
| 6,851,053 | B1 | 2/2005 | Liles et al. |
| 2002/0078153 | A1 * | 6/2002 | Chung et al. .................. 709/204 |
| 2004/0028200 | A1 | 2/2004 | Carlson |
| 2006/0293073 | A1 | 12/2006 | Rengaraju et al. |
| 2008/0181140 | A1 | 7/2008 | Bangor et al. |
| 2008/0267170 | A1 | 10/2008 | Allen et al. |
| 2008/0268824 | A1 | 10/2008 | Allen et al. |
| 2008/0268825 | A1 | 10/2008 | Allen et al. |
| 2008/0273682 | A1 | 11/2008 | Bakker et al. |

FOREIGN PATENT DOCUMENTS

| WO | WO2005/101857 A1 | 10/2005 |
| WO | WO 2007/007090 A1 | 1/2007 |

OTHER PUBLICATIONS

European Search Report (App. No. EP09153867.8) dated Sep. 10, 2009.
European Search Report (App. 09153861.1), dated Sep. 10, 2009.

* cited by examiner

Primary Examiner — Rasha Al Aubaidi
(74) Attorney, Agent, or Firm — Finnegan, Henderson, Farabow, Garrett & Dunner, LLP

(57) ABSTRACT

Systems and methods are described that facilitate a conference call between a plurality of communication devices. The method may comprise: providing a first primary communication device; providing a second primary communication device; providing a conference call controller; establishing a first control link between the first primary communication device and the conference call controller; communicating first identification data between the first primary communication device and the conference call controller via the first control link; establishing a media link between the first and second primary communication devices via the conference call controller. In certain embodiments, the first identification data corresponds to at least one participation level of the first primary communication device with respect to the media link. The method may further comprise establishing a second control link between the second primary communication device and the conference call controller; communicating second identification data between the second primary communication device and the conference call controller via the second control link; wherein the second identification data establishes a participation level of the second primary communication device with respect to the media link.

18 Claims, 8 Drawing Sheets

SYSTEMS AND METHODS FOR FACILITATING CONFERENCE CALLS USING SECURITY KEYS

TECHNICAL FIELD

Embodiments described herein relate generally to conference calling, and more specifically to systems and methods for facilitating conference calls using security keys.

BACKGROUND

Some embodiments described herein make use of a mobile station. A mobile station is a two-way communication device with advanced data communication capabilities having the capability to communicate with other computer systems, and is also referred to herein generally as a mobile device. A mobile device may also include the capability for voice communications. Depending on the functionality provided by a mobile device, it may be referred to as a data messaging device, a two-way pager, a cellular telephone with data messaging capabilities a PDA, a Smartphone, a wireless Internet appliance, or a data communication device (with or without telephony capabilities). A mobile device communicates with other devices through a network of transceiver stations.

Most applications for use with such mobile devices have been designed to be stand-alone applications (that generally do not interact with other applications), with a centralized email server providing email, a telephony system providing voice services, an instant messenger service allowing short, informal chats, etc. However, it has been recognised that these services or tools may be enhanced and may improve efficiency if greater interaction between such services was facilitated.

Consider a situation in which clicking on an email while at home automatically initiated a call from the users enterprise PBX (Private Branch Exchange) to the email sender, or launched an IM (Instant Messaging) session from a problem tracking system to allow informal communications between a support engineer and the customer. This inter-working has become known as "unified communications".

One way to implement a unified communications system within an enterprise may be through the introduction of proprietary protocols. "Glue" applications may be written to tie together the administration API (Application Programming Interface) published by one company with an equivalent API from another. However, such solutions require substantial effort to introduce inter-operability with services.

BRIEF DESCRIPTION OF THE DRAWINGS

For a better understanding of embodiments described herein, and to show more clearly how they may be carried into effect, reference will now be made, by way of example, to the accompanying drawings in which.

DETAILED DESCRIPTION

Figure 1A:
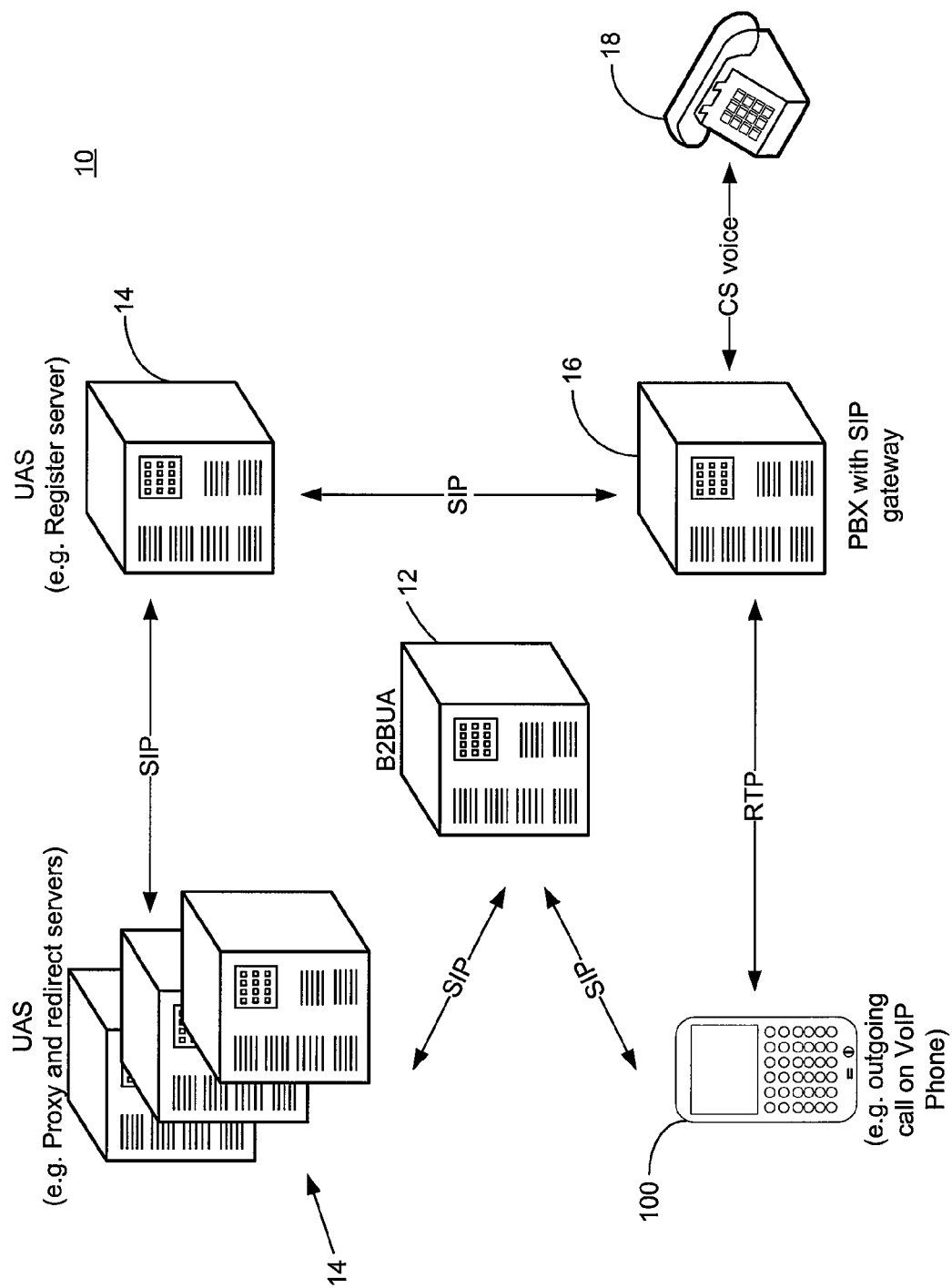
FIG. 1A is a block diagram of a network illustrating the implementation of SIP in a telephony application.

The difficulty in implementing a unified communications system within an enterprise has been recognized and a protocol created that allows the establishment, control and release of sessions between users and servers in a generic and extensible fashion. The Session Initiation Protocol (SIP) has been designed and further enhanced through the IETF (Internet Engineering Task Force). The applicants have recognized that SIP provides a flexible environment that can be leveraged to bring unified communications to mobile devices.

SIP is an application-layer control (signalling) protocol for creating, modifying and terminating sessions with one or more participants. These sessions include Internet multimedia conferences, Internet telephone calls and multimedia distribution. Members in a session can communicate via multicast or via a mesh of unicast relations, or a combination of these.

SIP as defined in RFC 2543 and superseded by RFC 3261 is the IETF's standard for multimedia session management. SIP is an ASCII-based, application-layer control protocol that supports user mobility. It is used to establish, maintain, modify and terminate multimedia sessions between two or more end points. It is important to note that SIP provides the control plane for these sessions. The data plane, in SIP is described by Session Description Protocol (SDP). This contains information pertaining to the session itself (i.e. subject, time-to-live, media info). RTP is one of many (possible) transports which may be described by SDP (as carried in a corresponding SIP message). Real-time Transport Protocol in the context of SIP, would be an 'out of band' means for delivering audio and/or video. Note other SDP transports could include IP, UDP, H.320 etc.

There is no requirement that the data plane and control plane follow the same path through the IP domain.

The SIP protocol allows:
(a) The determination of the location of the target end point. This is achieved by services such as address resolution, name mapping and call redirection.
(b) The determination of target end point availability. This not only provides an indication of whether the end point is available, but also if a call cannot be completed because the target end point is unavailable, SIP determines whether the called party is already on the phone or did not answer in the allotted number of rings.
(c) The determination of the media capabilities of the target end point. By using the Session Description Protocol (SDP), SIP can determine what common services exist between the end points. Thus sessions are established using only the media capabilities that can be supported by all end points.
(d) The establishment of a session between the originating and target end point.
(e) The management of the session. This includes the addition of new end points, the transfer of the session between end points, and the modification of the session such as change of codec or the addition of another data stream.
(f) The termination of sessions.

To aid the reader in understanding the implementation of SIP in a telephony application, reference is made to FIG. 1A. An example of a network, shown generally as 10, implementing a call from a VoIP phone is shown in FIG. 1A. Illustrated therein is a call originating from a mobile (or portable communication) device 100, discussed in greater detail below, which in this instance is fulfilling the role of User Agent Client (UAC). The call establishment signalling goes via a Back-to-Back User Agent (B2BUA) 12 and through a number of User Agent Servers (UAS) 14 to the PBX 16 (and ultimately to the receiving phone 18) using SIP signalling. As will be understood, alternate embodiments might utilize an SIP Proxy or an SIP Gateway. Once the control path is established and the call allowed, the voice media stream is sent via RTP to the PBX 16 directly.

FIG. 1A illustrates several different User Agent (UA) roles:

(a) User Agent Client (UAC)—a client application that initiates the SIP request. Typical clients are soft-phones (PCs that have phone applications) and VoIP based phones such as the BLACKBERRY™ 7270, manufactured by Research in Motion. However, any initiator of a SIP call is a UAC, including network elements such as the B2BUA. Gateways to non-SIP based systems can also act as UACs. A gateway may, for example, map a VoIP based call onto a traditional circuit-switched PBX.

(b) User Agent Server (UAS)—a server application that contacts the registered user when a SIP request is received and returns a response on behalf of the user. A server may be a proxy, which receives SIP messages and forward them to the next SIP server in the network. Proxy servers can provide functions such as authentication, authorization, network access control, routing, reliable request retransmission, and security. Alternatively a SIP server may act as a redirector, which provides the client with information about the next hop or hops that a message should take and then the client contacts the next hop server or UAS directly. A server also may act as a registrar server, which processes requests from UACs for registration of their current location.

(c) Back-to-Back User Agent (B2BUA)—a pair of user agents, one a server and the other a client, that terminates a SIP session on one side and maps through any requests to a second SIP session on the other side. A B2BUA provides a way to insert custom control into a SIP session between two end points. A B2BUA can act as a gateway into an enterprise domain where security needs require that all SIP sessions are controlled by a local server.

During any one SIP session, a UA will function either as a UAC or a UAS but not as both simultaneously. SIP provides a means to establish, control and terminate one or more multimedia sessions. However, SIP itself is not an application but a platform on which applications can be built. A SIP application may provide simple voice calling functionality in a low-end (minimal featured) softphone, or large and complex functionality such as for an eLearning application that would involve the transmission of voice, video and slides to a multi-participant conference.

Embodiments described herein are generally directed to systems and methods that provide users of a communication device, facility in providing participation levels on a conference call. In particular embodiments, participants in a conference call may be provided with differing participation levels.

In a broad aspect, there is provided a method of facilitating a conference call between a plurality of communication devices, the method comprising: providing a first primary communication device; providing a second primary communication device; providing a conference call controller; establishing a first control link between the first primary communication device and the conference call controller; communicating first identification data between the first primary communication device and the conference call controller via the first control link; establishing a media link between the first and second primary communication devices via the conference call controller. In certain embodiments, the first identification data corresponds to at least one participation level of the first primary communication device with respect to the media link.

The method may further comprise establishing a second control link between the second primary communication device and the conference call controller; communicating second identification data between the second primary communication device and the conference call controller via the second control link; wherein the second identification data establishes a participation level of the second primary communication device with respect to the media link.

In certain embodiments, the first identification data comprises at least one security key (and in some instances a plurality of security keys). The first identification data may comprise a first security key corresponding to a first participation level and a second security key corresponding to a second participation level and wherein the first participation level differs from the second participation level. The participation levels may permit (or conversely restrict) listening and/or speaking.

Further, in some implementations, the identification data may be communicated from the first primary communication device to the conference call controller.

In some embodiments, the first media link may comprise a voice signal and/or a multimedia signal.

A computer-readable medium may also be provided which may comprise instructions executable on the conference call controller for implementing steps of the method(s). In some further embodiments, a system may be provided for facilitating a conference call between a plurality of communication devices, the system comprising the conference call controller on which an application executes, wherein the application is programmed to perform steps of the method(s).

In another aspect, a system is provided for facilitating a conference call between a plurality of communication devices. The system may comprise a conference call controller. The conference call controller may be configured to establish a first control link with a first primary communication device. The conference call controller may also be configured to establish a media link between the first primary communication device and at least one (and in some instances a plurality of) second primary communication device(s). The conference call controller and the first primary communication device are configured to communicate first identification data via the first control link. The conference call controller may further be configured to establish a media link between the first and second primary communication devices via the conference call controller. The first identification data may correspond to at least one participation level of the first primary communication device with respect to the media link.

In some further embodiments, the conference call controller may be configured to establish a second control link with the second primary communication device. The conference call controller and the second primary communication device are configured to communicate second identification data via the second control link. Furthermore, the second identification data establishes a participation level of the second primary communication device with respect to the media link.

In certain embodiments, the first identification data comprises at least one security key (and in some instances a plurality of security keys). The first identification data may comprise a first security key corresponding to a first participation level and a second security key corresponding to a second participation level and wherein the first participation level differs from the second participation level. The participation levels may permit (or conversely restrict) listening and/or speaking.

Further, in some implementations, the identification data may be communicated from the first primary communication device to the conference call controller.

In some embodiments, the first media link may comprise a voice signal and/or a multimedia signal.

The conference call controller may be operatively coupled to a telecommunications network.

The first (and in some instances the second) primary communication device(s) may comprise a portable communication device.

The media link may comprise a voice signal. In addition or in the alternative, the media link may comprise a multimedia signal. As well, the media link may comprise a telecommunications link.

These and other aspects and features of various embodiments will be described in greater detail below.

To aid the reader in understanding the structure of a mobile device and how it communicates with other devices, reference is made to FIGS. 1B through 3.

Figure 1B:
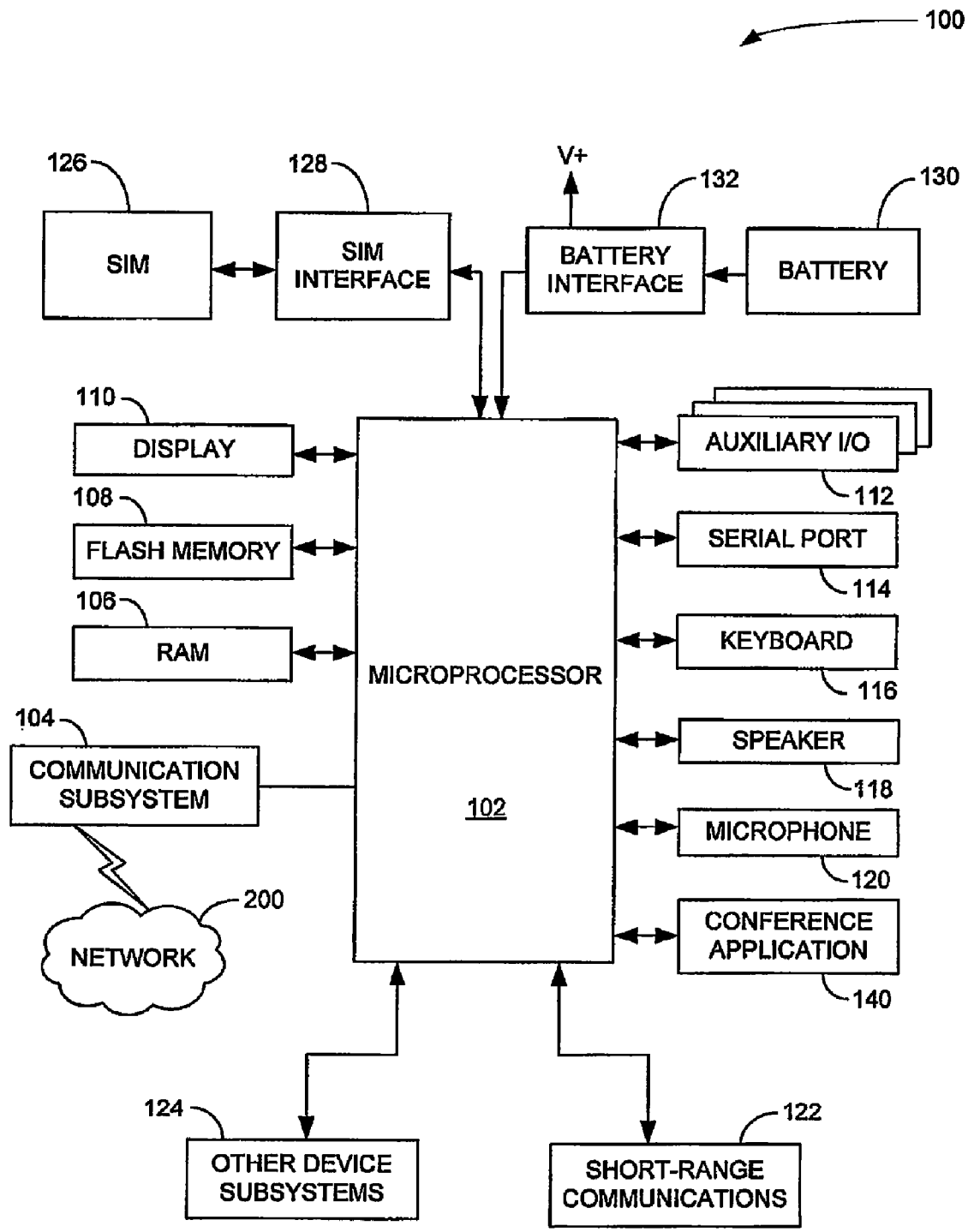
FIG. 1B is a block diagram of a mobile device in one example implementation.

Referring first to FIG. 1B, a block diagram of a mobile device in one example implementation is shown generally as 100. Mobile device 100 comprises a number of components, the controlling component being microprocessor 102. Microprocessor 102 controls the overall operation of mobile device 100. Communication functions, including data and voice communications, are performed through communication subsystem 104. Communication subsystem 104 receives messages from and sends messages to a wireless network 200. In this example implementation of mobile device 100, communication subsystem 104 is configured in accordance with the Global System for Mobile Communication (GSM) and General Packet Radio Services (GPRS) standards. The GSM/GPRS wireless network is used worldwide and it is expected that these standards will be superseded eventually by Enhanced Data GSM Environment (EDGE) and Universal Mobile Telecommunications Service (UMTS). New standards are still being defined, but it is believed that they will have similarities to the network behaviour described herein, and it will also be understood by persons skilled in the art that the invention is intended to use any other suitable standards that are developed in the future. The wireless link connecting communication subsystem 104 with network 200 represents one or more different Radio Frequency (RF) channels, operating according to defined protocols specified for GSM/GPRS communications. With newer network protocols, these channels are capable of supporting both circuit switched voice communications and packet switched data communications.

Although the wireless network associated with mobile device 100 is a GSM/GPRS wireless network in one example implementation of mobile device 100, other wireless networks may also be associated with mobile device 100 in variant implementations. Different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and future third-generation (3G) networks like EDGE and UMTS. Some older examples of data-centric networks include the Mobitex™ Radio Network and the DataTAC™ Radio Network. Examples of older voice-centric data networks include Personal Communication Systems (PCS) networks like GSM and Time Division Multiple Access (TDMA) systems.

Microprocessor 102 also interacts with additional subsystems such as a Random Access Memory (RAM) 106, flash memory 108, display 110, auxiliary input/output (I/O) subsystem 112, serial port 114, keyboard 116, speaker 118, microphone 120, short-range communications 122 and other device subsystems 124.

Some of the subsystems of mobile device 100 perform communication-related functions, whereas other subsystems may provide "resident" or on-device functions. By way of example, display 110 and keyboard 116 may be used for both communication-related functions, such as entering a text message for transmission over network 200, and device-resident functions such as a calculator or task list. Operating system software used by microprocessor 102 is typically stored in a persistent store such as flash memory 108, which may alternatively be a read-only memory (ROM) or similar storage element (not shown). Those skilled in the art will appreciate that the operating system, specific device applications, or parts thereof, may be temporarily loaded into a volatile store such as RAM 106.

Mobile device 100 may send and receive communication signals over network 200 after required network registration or activation procedures have been completed. Network access is associated with a subscriber or user of a mobile device 100. To identify a subscriber, mobile device 100 requires a Subscriber Identity Module or "SIM" card 126 to be inserted in a SIM interface 128 in order to communicate with a network. SIM 126 is one type of a conventional "smart card" used to identify a subscriber of mobile device 100 and to personalize the mobile device 100, among other things. Alternatively, by way of example only, other types of "smart cards" which might be used may include an R-UIM (removable user identity module) or a CSIM (CDMA (code division multiple access) subscriber identity module) or a USIM (universal subscriber identity module) card. Without SIM 126, mobile device 100 is not fully operational for communication with network 200. By inserting SIM 126 into SIM interface 128, a subscriber can access all subscribed services. Services could include: web browsing and messaging such as e-mail, voice mail, Short Message Service (SMS), and Multimedia Messaging Services (MMS). More advanced services may include: point of sale, field service and sales force automation. SIM 126 includes a processor and memory for storing information. Once SIM 126 is inserted in SIM interface 128, it is coupled to microprocessor 102. In order to identify the subscriber, SIM 126 contains some user parameters such as an International Mobile Subscriber Identity (IMSI). An advantage of using SIM 126 is that a subscriber is not necessarily bound by any single physical mobile device. SIM 126 may store additional subscriber information for a mobile device as well, including datebook (or calendar) information and recent call information.

Mobile device 100 is a battery-powered device and includes a battery interface 132 for receiving one or more rechargeable batteries 130. Battery interface 132 is coupled to a regulator (not shown), which assists battery 130 in providing power V+ to mobile device 100. Although current technology makes use of a battery, future technologies such as micro fuel cells may provide the power to mobile device 100.

Microprocessor 102, in addition to its operating system functions, enables execution of software applications on mobile device 100. A set of applications that control basic device operations, including data and voice communication applications, will normally be installed on mobile device 100 during its manufacture. Another application that may be loaded onto mobile device 100 would be a personal information manager (PIM). A PIM has functionality to organize and manage data items of interest to a subscriber, such as, but not limited to, e-mail, calendar events, voice mails, appointments, and task items. A PIM application has the ability to send and receive data items via wireless network 200. PIM data items may be seamlessly integrated, synchronized, and updated via wireless network 200 with the mobile device subscribers corresponding data items stored and/or associated with a host computer system. This functionality creates a mirrored host computer on mobile device 100 with respect to such items. This can be particularly advantageous where the host computer system is the mobile device subscribers office computer system.

Additional applications may also be loaded onto mobile device 100 through network 200, auxiliary I/O subsystem 112, serial port 114, short-range communications subsystem 122, or any other suitable subsystem 124. This flexibility in application installation increases the functionality of mobile device 100 and may provide enhanced on-device functions, communication-related functions, or both. For example, secure communication applications may enable electronic commerce functions and other such financial transactions to be performed using mobile device 100.

Serial port 114 enables a subscriber to set preferences through an external device or software application and extends the capabilities of mobile device 100 by providing for information or software downloads to mobile device 100 other than through a wireless communication network. The alternate download path may, for example, be used to load an encryption key onto mobile device 100 through a direct and thus reliable and trusted connection to provide secure device communication.

Short-range communications subsystem 122 provides for communication between mobile device 100 and different systems or devices, without the use of network 200. For example, subsystem 122 may include an infrared device and associated circuits and components for short-range communication. Examples of short range communication would include standards developed by the Infrared Data Association (IrDA), Bluetooth, and the 802.11 family of standards developed by IEEE.

In use, a received signal such as a text message, an e-mail message, or web page download will be processed by communication subsystem 104 and input to microprocessor 102. Microprocessor 102 will then process the received signal for output to display 110 or alternatively to auxiliary I/O subsystem 112. A subscriber may also compose data items, such as e-mail messages, for example, using keyboard 116 in conjunction with display 110 and possibly auxiliary I/O subsystem 112. Auxiliary subsystem 112 may include devices such as: a touch screen, mouse, track ball, infrared fingerprint detector, or a roller wheel with dynamic button pressing capability. Keyboard 116 is an alphanumeric keyboard and/or telephone-type keypad. A composed item may be transmitted over network 200 through communication subsystem 104.

For voice communications, the overall operation of mobile device 100 is substantially similar, except that the received signals would be output to speaker 118, and signals for transmission would be generated by microphone 120. Alternative voice or audio I/O subsystems, such as a voice message recording subsystem, may also be implemented on mobile device 100. Although voice or audio signal output is accomplished primarily through speaker 118, display 110 may also be used to provide additional information such as the identity of a calling party, duration of a voice call, or other voice call related information.

Figure 2:
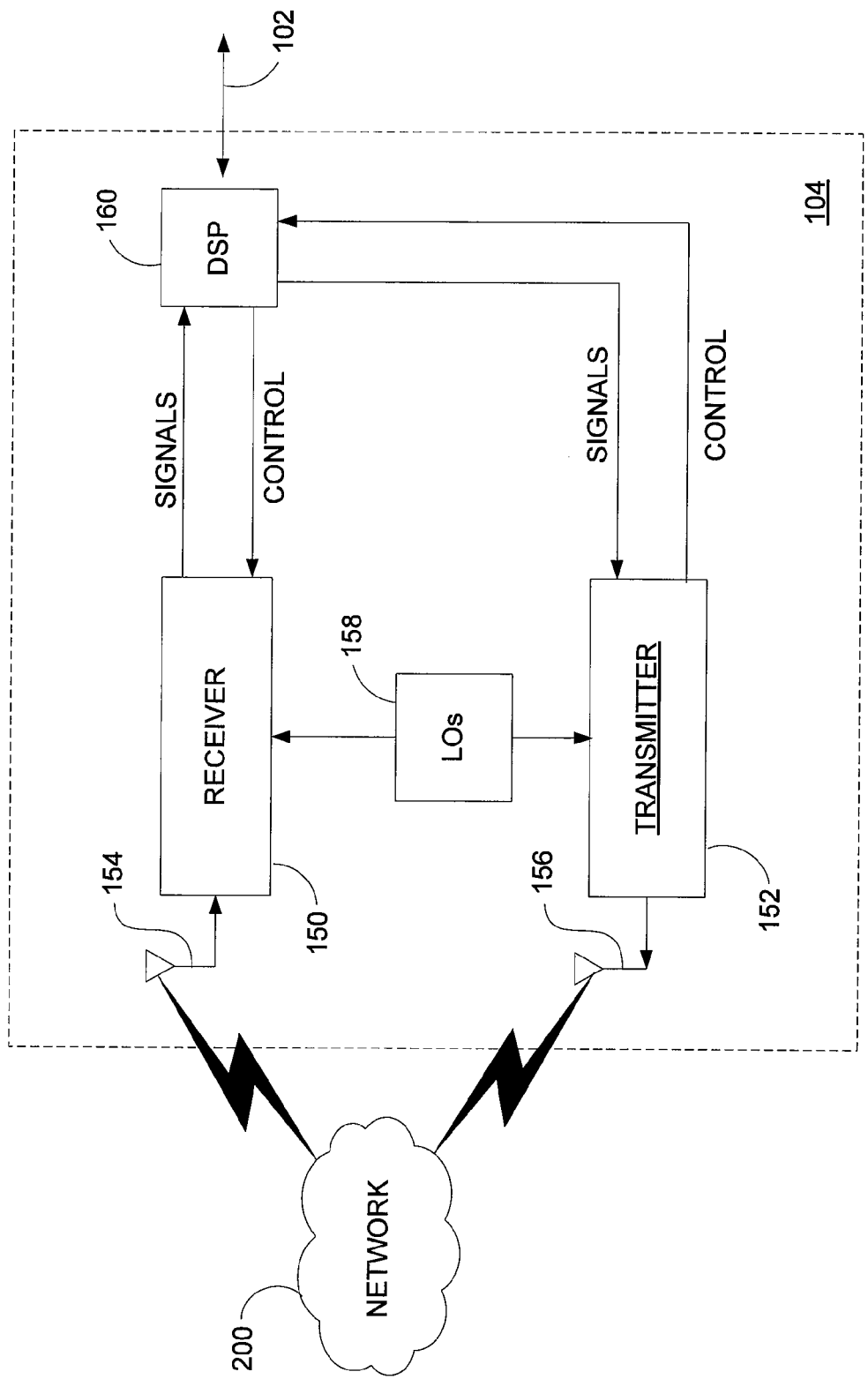
FIG. 2 is a block diagram of a communication subsystem component of the mobile device of FIG. 1B.

Referring now to FIG. 2, a block diagram of the communication subsystem component 104 of FIG. 1 is shown. Communication subsystem 104 comprises a receiver 150, a transmitter 152, one or more embedded or internal antenna elements 154, 156, Local Oscillators (LOs) 158, and a processing module such as a Digital Signal Processor (DSP) 160.

The particular design of communication subsystem 104 is dependent upon the network 200 in which mobile device 100 is intended to operate, thus it should be understood that the design illustrated in FIG. 2 serves only as one example. Signals received by antenna 154 through network 200 are input to receiver 150, which may perform such common receiver functions as signal amplification, frequency down conversion, filtering, channel selection, and analog-to-digital (A/D) conversion. A/D conversion of a received signal allows more complex communication functions such as demodulation and decoding to be performed in DSP 160. In a similar manner, signals to be transmitted are processed, including modulation and encoding, by DSP 160. These DSP-processed signals are input to transmitter 152 for digital-to-analog (D/A) conversion, frequency up conversion, filtering, amplification and transmission over network 200 via antenna 156. DSP 160 not only processes communication signals, but also provides for receiver and transmitter control. For example, the gains applied to communication signals in receiver 150 and transmitter 152 may be adaptively controlled through automatic gain control algorithms implemented in DSP 160.

The wireless link between mobile device 100 and a network 200 may contain one or more different channels, typically different RF channels, and associated protocols used between mobile device 100 and network 200. An RF channel is a limited resource that must be conserved, typically due to limits in overall bandwidth and limited battery power of mobile device 100.

When mobile device 100 is fully operational, transmitter 152 is typically keyed or turned on only when it is sending to network 200 and is otherwise turned off to conserve resources. Similarly, receiver 150 is periodically turned off to conserve power until it is needed to receive signals or information (if at all) during designated time periods.

Figure 3:
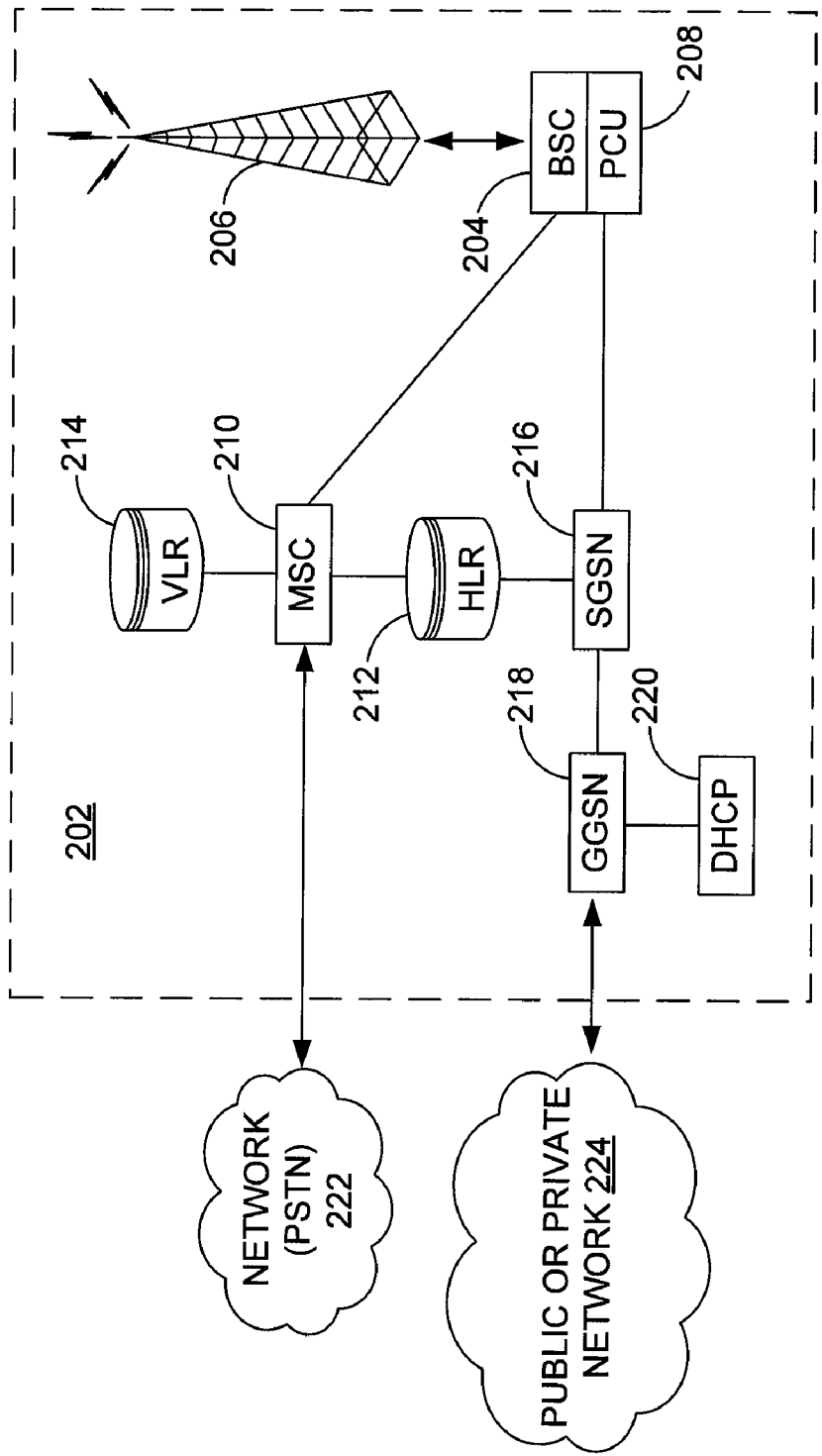
FIG. 3 is a block diagram of a node of a wireless network.

Referring now to FIG. 3, a block diagram of a node of a wireless network is shown as 202. In practice, network 200 comprises one or more nodes 202. Mobile device 100 communicates with a node 202 within wireless network 200. In the example implementation of FIG. 3, node 202 is configured in accordance with General Packet Radio Service (GPRS) and Global Systems for Mobile (GSM) technologies. Node 202 includes a base station controller (BSC) 204 with an associated tower station 206, a Packet Control Unit (PCU) 208 added for GPRS support in GSM, a Mobile Switching Center (MSC) 210, a Home Location Register (HLR) 212, a Visitor Location Registry (VLR) 214, a Serving GPRS Support Node (SGSN) 216, a Gateway GPRS Support Node (GGSN) 218, and a Dynamic Host Configuration Protocol (DHCP) 220. This list of components is not meant to be an exhaustive list of the components of every node 202 within a GSM/GPRS network, but rather a list of components that are commonly used in communications through network 200.

In a GSM network, MSC 210 is coupled to BSC 204 and to a landline network, such as a Public Switched Telephone Network (PSTN) 222 to satisfy circuit switched requirements. The connection through PCU 208, SGSN 216 and GGSN 218 to the public or private network (Internet) 224 (also referred to herein generally as a shared network infrastructure) represents the data path for GPRS capable mobile devices. In a GSM network extended with GPRS capabilities, BSC 204 also contains a Packet Control Unit (PCU) 208 that connects to SGSN 216 to control segmentation, radio channel allocation and to satisfy packet switched requirements. To track mobile device location and availability for both circuit switched and packet switched management, HLR 212 is shared between MSC 210 and SGSN 216. Access to VLR 214 is controlled by MSC 210.

Station 206 is a fixed transceiver station. Station 206 and BSC 204 together form the fixed transceiver equipment. The fixed transceiver equipment provides wireless network coverage for a particular coverage area commonly referred to as a "cell". The fixed transceiver equipment transmits communication signals to and receives communication signals from mobile devices within its cell via station 206. The fixed transceiver equipment normally performs such functions as modulation and possibly encoding and/or encryption of signals to be transmitted to the mobile device in accordance with particular, usually predetermined, communication protocols and parameters, under control of its controller. The fixed transceiver equipment similarly demodulates and possibly decodes and decrypts, if necessary, any communication signals received from mobile device 100 within its cell. Communication protocols and parameters may vary between different nodes. For example, one node may employ a different modulation scheme and operate at different frequencies than other nodes.

For all mobile devices 100 registered with a specific network, permanent configuration data such as a user profile is stored in HLR 212. HLR 212 also contains location information for each registered mobile device and can be queried to determine the current location of a mobile device. MSC 210 is responsible for a group of location areas and stores the data of the mobile devices currently in its area of responsibility in VLR 214. Further VLR 214 also contains information on mobile devices that are visiting other networks. The information in VLR 214 includes part of the permanent mobile device data transmitted from HLR 212 to VLR 214 for faster access. By moving additional information from a remote HLR 212 node to VLR 214, the amount of traffic between these nodes can be reduced so that voice and data services can be provided with faster response times and at the same time requiring less use of computing resources.

SGSN 216 and GGSN 218 are elements added for GPRS support; namely packet switched data support, within GSM. SGSN 216 and MSC 210 have similar responsibilities within wireless network 200 by keeping track of the location of each mobile device 100. SGSN 216 also performs security functions and access control for data traffic on network 200. GGSN 218 provides internetworking connections with external packet switched networks and connects to one or more SGSN's 216 via an Internet Protocol (IP) backbone network operated within the network 200. During normal operations, a given mobile device 100 must perform a "GPRS Attach" to acquire an IP address and to access data services. This requirement is not present in circuit switched voice channels as Integrated Services Digital Network (ISDN) addresses are used for routing incoming and outgoing calls. Currently, all GPRS capable networks use private, dynamically assigned IP addresses, thus requiring a DHCP server 220 connected to the GGSN 218. There are many mechanisms for dynamic IP assignment, including using a combination of a Remote Authentication Dial-In User Service (RADIUS) server and DHCP server. Once the GPRS Attach is complete, a logical connection is established from a mobile device 100, through PCU 208, and SGSN 216 to an Access Point Node (APN) within GGSN 218. The APN represents a logical end of an IP tunnel that can either access direct Internet compatible services or private network connections. The APN also represents a security mechanism for network 200, insofar as each mobile device 100 must be assigned to one or more APNs and mobile devices 100 cannot exchange data without first performing a GPRS Attach to an APN that it has been authorized to use. The APN may be considered to be similar to an Internet domain name such as "myconnection.wireless.com".

Once the GPRS Attach is complete, a tunnel is created and all traffic is exchanged within standard IP packets using any protocol that can be supported in IP packets. This includes tunneling methods such as IP over IP as in the case with some IPSecurity (IPsec) connections used with Virtual Private Networks (VPN). These tunnels are also referred to as Packet Data Protocol (PDP) Contexts and there are a limited number of these available in the network 200. To maximize use of the PDP Contexts, network 200 will run an idle timer for each PDP Context to determine if there is a lack of activity. When a mobile device 100 is not using its PDP Context, the PDP Context can be deallocated and the IP address returned to the IP address pool managed by DHCP server 220.

Figure 4:
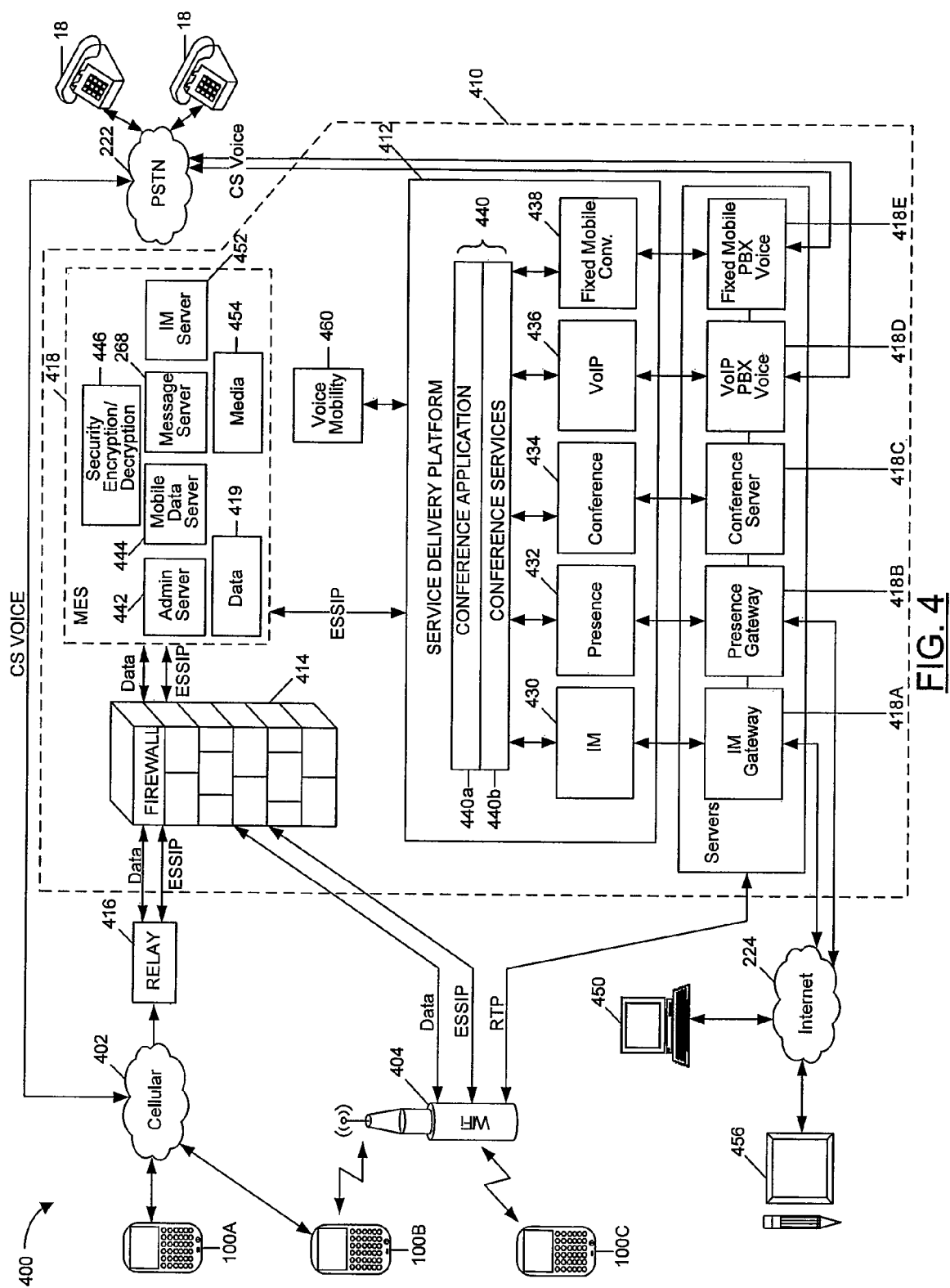
FIG. 4 is a block diagram illustrating components of a communication system in one example configuration.

Referring now to FIG. 4, a block diagram is shown illustrating components of a communication system, shown generally as 400, in one example configuration. Host system 400 will typically incorporate a corporate office or other local area network (LAN) shown generally as 410, but may instead be a home office computer or some other private system, for example, in variant implementations. In the example shown in FIG. 4, communication system 400 incorporates a LAN 410 of an organization to which a user of a mobile device 100 (with example embodiments illustrated as 100A, 100B, 100C) belongs.

As illustrated in FIG. 4, some embodiments of the mobile device 100A operate on a cellular network 402 (WAN, "wide area network"), while other embodiments 100C may operate on the 802.11 WiFi network 404 only (WLAN, "wireless local area network"). Such devices 100C which operate only on a WLAN 404, may be provided with SIP-based Voice over IP (VoIP) functionality to facilitate external calling. Some embodiments of the mobile device 100B may be dual mode and may be configured to operate both on the cellular network 402 and on the WLAN. The mobile devices 100A, 100B, 100C are typically configured to utilize SIP. Preferably, the mobile device 100A, 100B, 100C SIP stack will be configured to communicate over both UDP and GME transport simultaneously.

To support multiple SIP applications on a mobile device 100A, 100B, 100C a SIP UA API (SIP User Agent Application Programming Interface) is preferably introduced. This API abstracts the applications from the SIP implementation, thus removing the need for the application programmer to know about the details of the protocol.

The SIP UA API will provide methods to construct, control and delete dialogs, a dialog being a single session between the device and some endpoint. For example, in a VoIP call a dialog is a call leg between the device and the PBX. A dialog may have none, one or multiple media streams associated. For example, a video/audio call will have two bidirectional media streams.

In addition the SIP AU API provides means to register, reregister and deregister SIP applications from the associated registrar server. This will be implemented in such a way to abstract the details of the registration from the application, so the application is unable to modify the registration parameters or the registrar information.

Finally the SIP UA API will provide a set of methods to allow applications a way to subscribe for events from a remote server and to notify a remote server of local application events.

The connectivity of certain embodiments of the mobile devices 100A, 100B, 100C are also illustrated in FIG. 4. As can be seen, the WAN mobile device 100A is connected through the relay 416 to the enterprise external firewall 414 and on to the Mobile Enterprise Server (MES) 418. The WLAN mobile device 100C sends and receives data by connecting over the Enterprise WLAN to the MES 418 bypassing the Relay 416. SIP based IP Telephony is provided via a direct UDP connection to the SIP server and similarly RTP between the end points. The dual mode mobile device 100B may utilize connections available to the other types of mobile devices 100A, 100C.

A Service Delivery Platform (SDP) 412 is located within the enterprise LAN 410 behind the corporate firewall 414. A SIP enabled mobile device 100A, 100B, 100C communicates with the SDP 412 usually over the GME connection either through the Relay 416 or directly with the Mobile Enterprise Server (MES) 418 if operating in serial bypass mode (e.g. WLAN Enterprise Data). On the other side of the firewall 414, the SDP 412 communicates with existing enterprise servers.

The SDP 412 typically will be involved in the control flow. The media flow, the RTP session in the embodiment illustrated in FIG. 4, routes directly to the PBXs, 418D, 418E from the mobile device 100B, 100C.

The SDP 412 is designed to be a platform upon which any number of applications may be executed. The control towards the device 100A, 100B, 100C will typically utilize a custom or enterprise-specific SIP (ESSIP), but the SDP 412 may utilize different protocols in communicating with other servers. This is illustrated in FIG. 4, where five example applications on the SDP 412, namely Instant Messaging (IM) 430, Presence 432, Conference 434, VoIP (voice over internet protocol) 436, and Fixed Mobile Convergence 438 use a variety of third-party protocols in communication with the gateway and PBX servers 418A, 418B, 418C, 418D providing the application functionality.

The MES 418 may comprise various software and/or hardware elements for administering certain communication functionality of the mobile devices 100A, 100B, 100C. For example, the MES 418 may comprise an administration server 442, a mobile data server 444, a message server 268 (discussed in greater detail below), a database 419, a security module 446 which may be configured to encrypt and decrypt data and/or messages, an IM server 452 and a media server 454.

LAN 410 may comprise a number of network components connected to each other by LAN connections. For instance, one or more users' desktop computers (not shown), each of which may comprise a cradle, may be situated on LAN 410. Cradles for mobile device 100A, 100B, 100C may be coupled to a desktop computer by a serial or a Universal Serial Bus (USB) connection, for example. Such cradles may facilitate the loading of information (e.g. PIM data, private symmetric encryption keys to facilitate secure communications between mobile device 100A, 100B, 100C and LAN 410) from a desktop computer to mobile device 100A, 100B, 100C, and may be particularly useful for bulk information updates often performed in initializing mobile device 100A, 100B, 100C for use. The information downloaded to mobile device 100A, 100B, 100C may include certificates used in the exchange of messages. It will be understood by persons skilled in the art that user computers may also be connected to other peripheral devices not explicitly shown in FIG. 4.

Furthermore, only a subset of network components of LAN 410 are shown in FIG. 4 for ease of exposition, and it will be understood by persons skilled in the art that LAN 410 will comprise additional components not explicitly shown in FIG. 4, for this example configuration. More generally, LAN 410 may represent a smaller part of a larger network [not shown] of the organization, and may comprise different components and/or be arranged in different topologies than that shown in the example of FIG. 4.

In one example implementation, LAN 410 may comprise a wireless VPN router [not shown] to facilitate data exchange between the LAN 410 and mobile device 100B, 100C. A wireless VPN router may permit a VPN connection to be established directly through a specific wireless network to mobile device 100A, 100B, 100C. With the implementation of Internet Protocol (IP) Version 6 (IPV6) into IP-based wireless networks, enough IP addresses will be available to dedicate an IP address to every mobile device 100B, 100C, making it possible to push information to a mobile device 100B, 100C at any time. An advantage of using a wireless VPN router is that it could be an off-the-shelf VPN component, not requiring a separate wireless gateway and separate wireless infrastructure to be used. A VPN connection might utilize Transmission Control Protocol (TCP)/IP or User Datagram Protocol (UDP)/IP connection to deliver the messages directly to mobile device 100A, 100B, 100C in such implementation.

The communication system 400 shall preferably comprise the VoIP application 436 which is configured to utilize SIP to provide VoIP functionality. The SDP 412 is configured to route VoIP ESSIP requests from the mobile device 100B, 100C to the VoIP application 436, thereby enabling IP calling from a mobile device 100B, 100C connected on the WLAN to an existing SIP enabled gateway or PBX server 418A, 418B, 418C, 418D, 418E. For example, VoIP functionality may include basic calling features such as make and take a VoIP call, hold and resume, transfer (attended and semi attended), ad-hoc conferencing, among others.

The VoIP telephony functionality in some embodiments may be limited to those devices (such as, for example, devices 100B, 100C) that are connected to the WLAN. The use of VPN may allow devices 100B, 100C that are outside the enterprise to access enterprise VoIP services in a secure fashion.

The inventors have recognized the non-uniform way each third-party manufacturers PBX (or other gateway server) 418A, 418B, 418C, 418D, 418E uses SIP. Typically, each such gateway 418A, 418B, 418C, 418D, 418E uses its own version of SIP call flow to establish, control and release calls. As a result, the SIP call flow between the endpoint (typically a communication device, such as for example, mobile device 100A, 100B, 100C) and the PBX (or gateway) 418A, 418B, 418C, 418D, 418E needs to be customized for that particular PBX (or gateway) 418A, 418B, 418C, 418D, 418E.

The VoIP application 436 incorporates a customized Back-to-Back User Agent (B2BUA) (not shown) in the Service Delivery Platform 412, thereby positioned between the mobile device 100B, 100C and the gateway 418A, 418B, 418C, 418D, 418E. The B2BUA abstracts the details of the PBX call flows, registration, call control and configuration from the mobile device 100B, 100C. The B2BUA implements a defined set of ESSIP call flows to the mobile device 100B, 100C that can support a basic set of telephony procedures. The B2BUA also satisfies the SIP call flows that are specific to the gateway 418A, 418B, 418C, 418D, 418E for the same set of telephony procedures.

As each manufacturers gateway server 418A, 418B, 418C, 418D, 418E typically requires a different set of call flows for the same feature, the B2BUA encapsulates the gateway 418A, 418B, 418C, 418D, 418E specifics for the basic calling feature set into a PBX Abstraction Layer (PAL), each gateway 418A, 418B, 418C, 418D, 418E having its own specific PAL.

In addition, if necessary the B2BUA can support other PBX-specific feature extensions, which may be made available to communication devices coupled to the network 410, such as the mobile devices 110B, 100C. These extensions are handled through a PBX Extension Layer (PEL) in the B2BUA, which, like the PAL, abstracts the complexities of each PBX 418A, 418B, 418C, 418D, 418E for a given extension feature set. However, as the extension feature sets between different PBX 418A, 418B, 418C, 418D, 418E will not be the same, it may not be possible to develop a common user interface (UI). Accordingly, a plug-in application may be downloaded to the communication devices coupled to the network 410, such as the mobile devices 110B, 100C, to extend the UI and to provide communication device the necessary SIP Application information on how to handle new features. This plug-in is the Menu and Signalling Extension Plug-in (MSP). As will be understood, the PAL, PEL and MSP are all part of Extensible Signalling Framework (ESF).

With respect to the instant messaging services, the MES 418 may comprise an XMPP2SIMPLE (Extensible Messaging and Presence Protocol to SIP Instant Messaging and Presence Leveraging Extensions) SIP application to enable integration of SIP with an IM session. For example, a voice call may be established over VoIP or over a traditional circuit switched medium directly from an IM session screen. The voice connection may be requested by either party in the IM session. As well as voice, the XMPP2SIMPLE application may also interface SIMPLE (SIP Instant Messaging and Presence Leveraging Extensions) based IM systems to the IM internal architecture of the mobile devices 100A, 100B, 100C.

The MES 418 may use an XMPP (Extensible Messaging and Presence Protocol) based API (Application Programming Interface) over an IPe (IP endpoint) secured socket provided by the XMPP2SIMPLE Application to request that SIP functions be accessed. This API may provide any user identifications that are required and routing information to the VoIP gateway. The gateway might be the VoIP PBX 418D or it might be a VoIP enabled server. The SDP 412 establishes a SIP session to the device 100A, 100B, 100C and a second to the gateway (such as the PBX 418D). The RTP media flow is routed directly to the VoIP gateway (such as the PBX 418D).

Consider a situation in which an IM session is in process between a first mobile device eg. 100B, and a second mobile device 100C. The session may use the enterprise-specific IM protocol between the devices 100B, 100C and an IM Proxy Server in the MES 418, and the third-party IM protocol between the IM Proxy Server and the IM server (eg. IM PBX 418A).

At some point in time, either device 100B, 100C, may request that the session be converted into a voice connection. The MES IM Server 452 requests over the XMPP based API that XMPP2SIMPLE set up an SIP based call. For each mobile device 100B, 100C, the XMPP2SIMPLE acts as a B2BUA, setting up one SIP session with the mobile device 100B, 100C using the ESSIP flows, and a second session with the IM Server 418A using the IM Server 418A specific SIP. These connections are then manipulated to connect the RTP media flow between the two mobile devices 100B, 100C. Communication may also be established between mobile devices 100A, 100B, 100C and other networked devices, such as, for example, computer 450 (which may be equipped to provide voice communication, for example using VoIP) and electronic "whiteboard" 456 (via the internet 224), and telephones 18 (via the PSTN).

Alternatively, a call may be established over circuit switched media. For example, an IM session running on a WAN mobile device 100A may request the establishment of a voice connection. In this case the MES IM Server 452 could request directly to the Fixed Mobile PBX 418E for a circuit switched call, or through the SDP 412 which would establish two circuit switched call legs, one to each party, via the PBX 418E.

The communication system 400 may also provide for certain applications to interact directly with other application services, e.g. applications that provide media streaming capabilities such as e-learning or MP3/video playback, downloading and sharing. Consider a scenario in which an enterprise-wide announcement is to be made. Here the announcement is stored in a MES service which proceeds to call out to all enterprise mobile devices 100A, 100B, 100C.

These services may require a multimedia session to be established between a server and the ESSIP enabled devices 100A, 100B, 100C. In addition there are a number of other servers such as Lightweight Directory Access Protocol (LDAP) servers, location servers, a database application, or an extensible markup language (XML) application. These application services provide back-end services such as directory, authentication, and billing services.

In this case the MES media application or server 454 might again be configured to use an API to set up the multimedia session or to obtain information from the SDP 412. The SDP 412 acts as a UAS, controlling the session and setting the RTP or similar stream directly to the MES Media Server 454. Once the multimedia streaming session has finished, the MES Media Server 454 terminates the SIP session via an API call.

The communication system 400 may also be configured with a voice mobility module 460 (such as the Voice Mobility Management system distributed by Ascendent Systems) which may comprise software and hardware to offer voice mobility anchored at the network between WLAN 404 and cellular 402 networks. The system 400 may offer enhancements such as single number in and out of the enterprise, conferencing, single voice mailbox, etc.

The voice mobility module 460 may use the SIP server through CSTA (Computer Supported Telecommunication Applications) interface that allows first party call control. The interface between the SDP 412 and the PBX 418D, 418E may be SIP Trunk.

In this environment, the voice mobility module 460 controls the media flow passing over the RTP session.

The SDP 412 may interface to the MES 418 for signalling to the device 100A, 100B, 100C and database support, and to the application servers such as the gateway or PBX servers 418A, 418B, 418C, 418D, 418E for application support. This section shall describe in more detail how those interfaces are to be managed.

The SDP 412 may interface to the MES 418 through an ESSIP Connector, a service that communicates directly with a Dispatcher. The ESSIP Connector terminates the GME protocol and is responsible for pushing the SIP signals to an SIP Server (not shown) over a TLS secured socket. This arrangement requires that a new content type be created for SIP, and allows a new ESSIP service book to be pushed to a mobile device 100A, 100B, 100C.

On the other side of the SIP/TLS link, the SDP 412 may also comprise a Unified Communications (UC) Server (not shown). The UC Server executes the SIP applications and communicates to the gateway and PBX servers 418A, 418B, 418C, 418D, 418E, MES IM Server 452, IM server 418A, and voice mobility module 460, etc.

Any number of ESSIP Connectors may support access a single UC Server, the exact number being limited by the configuration of the components over hardware platforms. All configurations using a single UC Server must be connected to the same mobile device database domain.

Both the ESSIP Connector and the UC Server may read data for configuration from the database 419 via an SDP MES Management Server using a web services interface. This component also offers the SDP administration UI.

The UC Server stores information on the MES database 419, which is used at reset to configure the UC Services and users. The following items may be included in the basic server configuration: Sip Realm; Sip Domain Name; Sip Server Address; Sip Server Port; Sip Server Transport; Proxy Server Address; Proxy Server Port; and Proxy Server Transport.

The following items may also be included as part of the database 419 per user: Sip User Display Name; Sip User ID; Sip User Password; Sip Realm; Sip Registration Timeout; Sip Local Port; Sip RTP Media Port; Sip Domain Name; Sip Server Type; Sip Server Address; Sip Server Port; Sip Server Transport; Emergency Number; Sip Secondary Server Type; Sip Secondary Server Address; Sip Secondary Server Port; and Sip Secondary Server Transport.

The UC Server may also require notification from the database 419 when an administrator adds a user into the system 400 so that it can update the internal table without scanning the whole database 419.

The SDP Management Server (SDP MS) (not shown) may abstract the MES database 419 from the SDP 412 components and provides a user interface for administration purposes. The ESSIP Connector and the UC Server will both obtain configuration through the SDP BMS. As the users of UC Services will also be the general MES users, then those configuration items that are specific to each user will require additions to existing user records.

The communications network 400 is preferably also provided with a conference call controller module 440 configured to facilitate and control conference calls between 2 or more parties. As will be discussed in greater detail, below, the controller module 440 may comprise an application or other programming and is configured to coordinate the conference call functionality and to facilitate the exchange of voice and other media between conference call participants. The controller module 440 may comprise conference application 440a and conference services modules 400b and may reside in or otherwise form part of the SDP 412.

Messages intended for a user of mobile device 100 are initially received by a message server 268 of LAN 410, which may form part of the MES 418. Such messages may originate from any of a number of sources. For instance, a message may have been sent by a sender from a computer 450 within LAN 410, from a different mobile device [not shown] connected to wireless network 200 (or 404) or to a different wireless network, or from a different computing device (such as computer 450) or other device capable of sending messages, via the shared network infrastructure 224, and possibly through an application service provider (ASP) or Internet service provider (ISP), for example.

Message server 268 typically acts as the primary interface for the exchange of messages, particularly e-mail messages, within the organization and over the shared network infrastructure 224. Each user in the organization that has been set up to send and receive messages is typically associated with a user account managed by message server 268. One example of a message server 268 is a Microsoft Exchange™ Server. In some implementations, LAN 410 may comprise multiple message servers 268. Message server 268 may also be adapted to provide additional functions beyond message management, including the management of data associated with calendars and task lists, for example.

Figure 5:
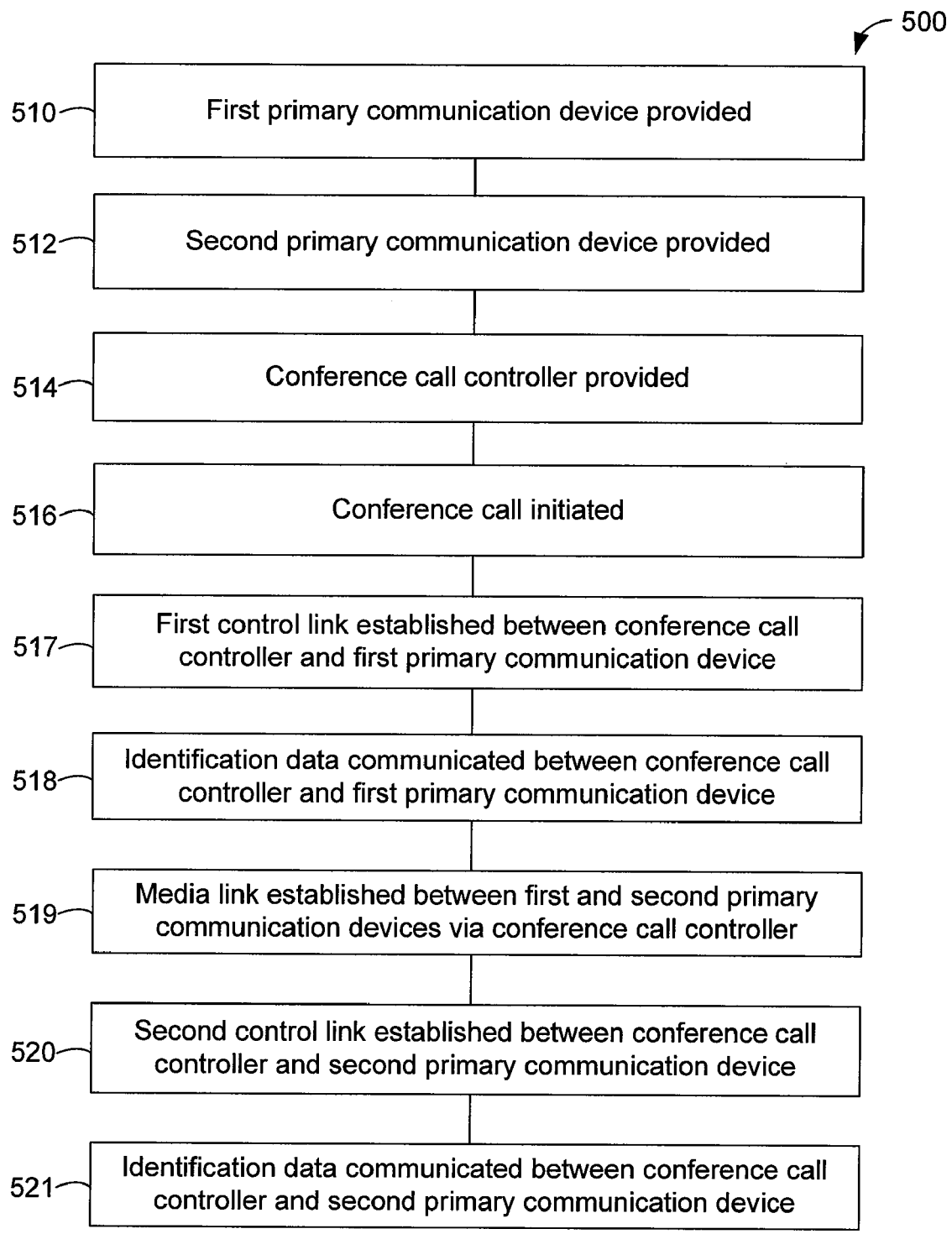
FIG. 5 is a flowchart illustrating steps in a method of facilitating a conference call between a plurality of communication devices in accordance with at least one embodiment.
Figure 6A:
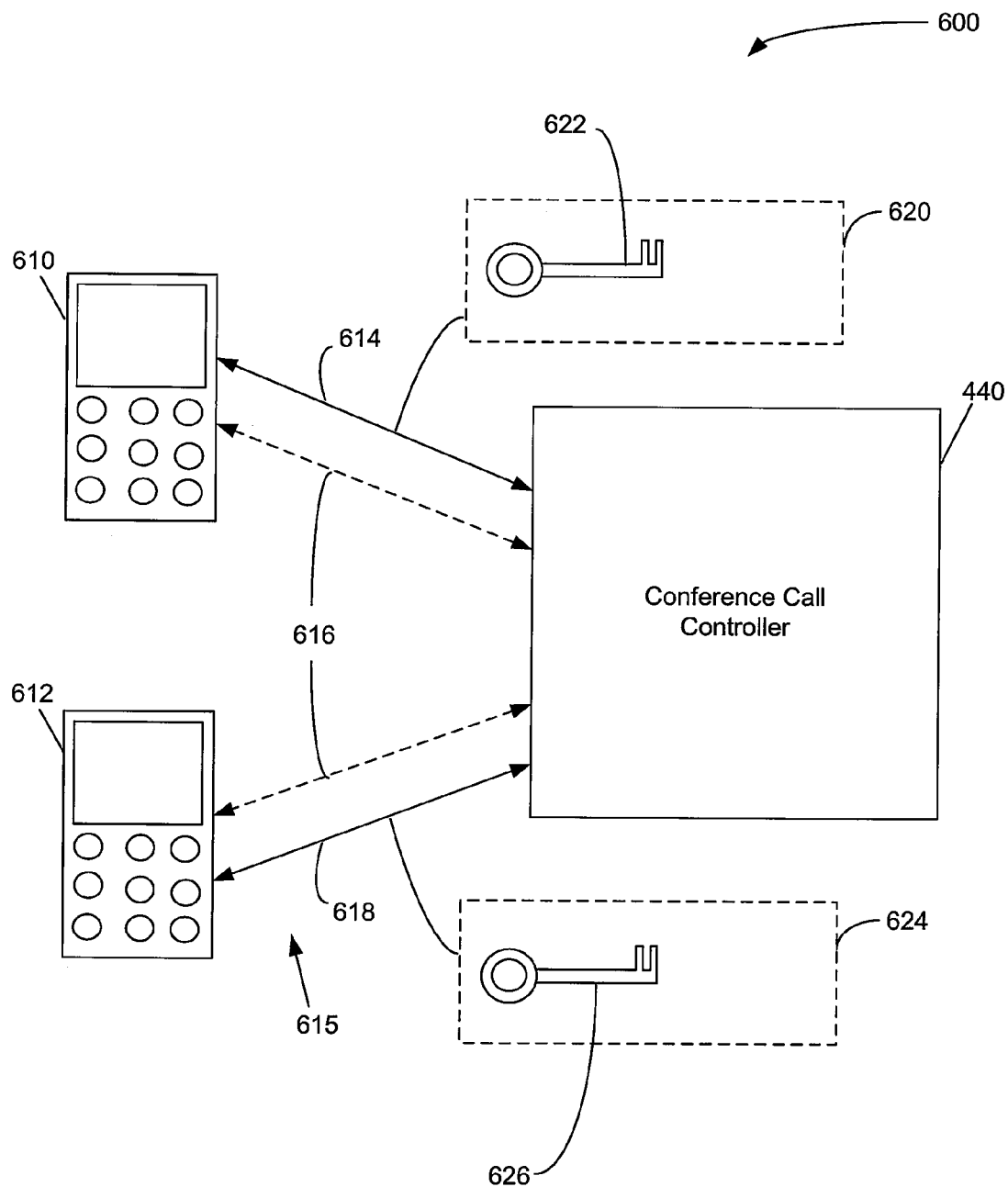
FIG. 6A is a schematic diagram illustrating components of a conference call in accordance with at least one embodiment.
Figure 6B:
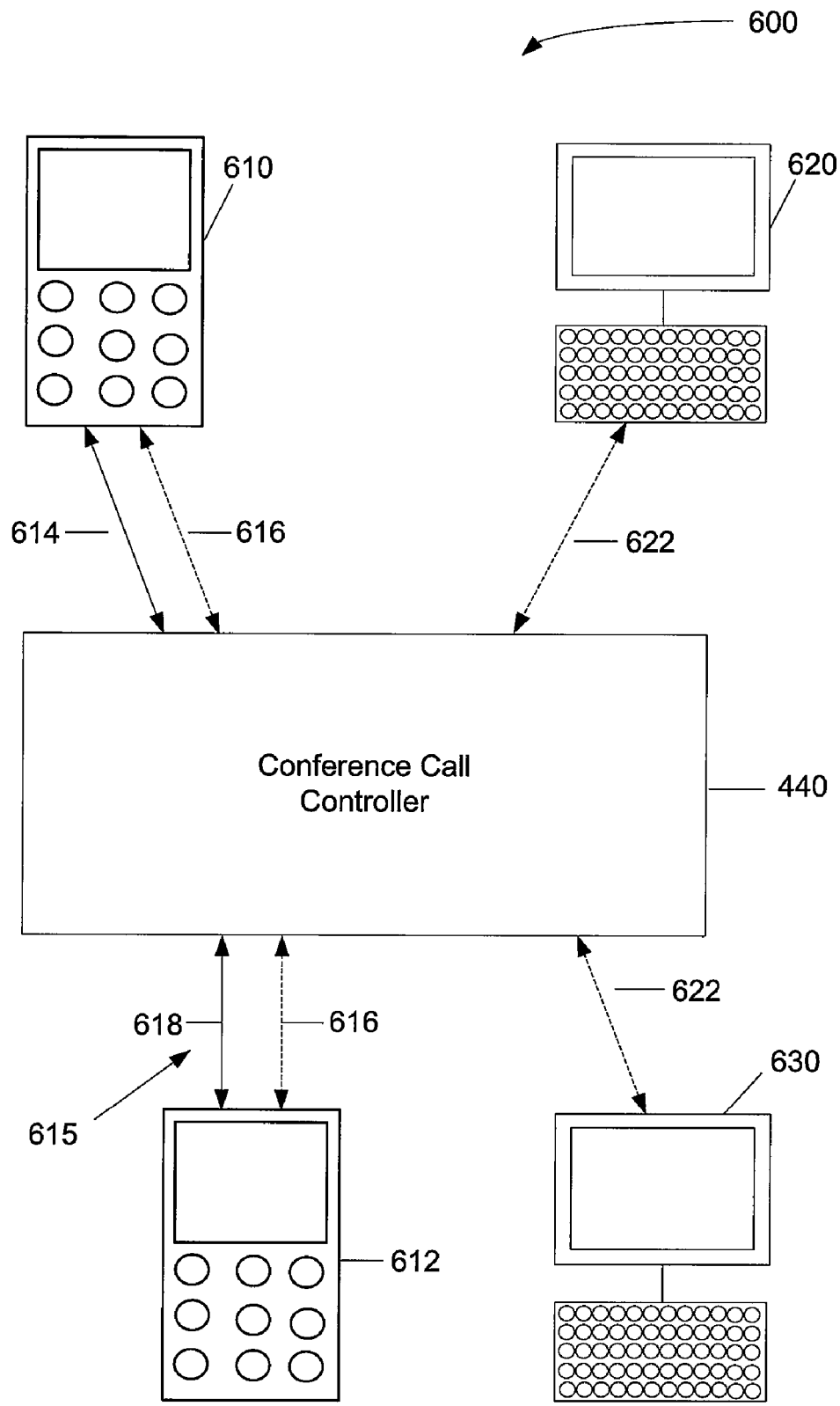
FIG. 6B is a schematic diagram illustrating components of a conference call in accordance with at least one embodiment, upon introduction of an alternate media link to a first alternate communication device.

Referring now to FIG. 5, a flowchart illustrating steps in a method of facilitating a conference call between a plurality of communication devices in accordance with at least one embodiment is shown generally as 500. Additional details of some of the features described below in respect of the method 500 may be described elsewhere in the present specification. Referring simultaneously to FIGS. 6A and 6B, illustrated therein are schematic diagrams illustrating exemplary aspects of a conference call, shown generally as 600, implemented in accordance with the present disclosure.

In one embodiment, at least some of the steps of the method are performed by a conference call application that executes and resides on a conference call controller (e.g. conference call controller 440 of FIG. 4). In variant embodiments, the conference call application need not be a stand-alone application, and the functionality of the application may be implemented in one or more applications executing and residing on the controller or other computing device.

Method 500 commences at Block 510 in which a first primary communication device 610 has been provided. For example, mobile communication device 100B may be selected for use as a first primary communication device 610 in a conference call as contemplated herein. Similarly, a second primary communication device 612, for example mobile communication device 100C, may be provided (Block 512). A conference call controller, such as controller 440, may also be provided (Block 514).

The conference call may then be initiated, typically utilizing both SIP and RTP protocols, as discussed above (Block 516). A first control link (as indicated by line 614 in FIG. 6A) may be established between the conference call controller 440 and the first primary communication device 610 (Block 517).

Such control link 614 may be in the form of a data signal in which first identification data 620 may be communicated between the controller 440 and the first primary communication device 610 (Block 518). Such identification data 620 may comprise at least one security key 622 which may be authenticated. A security key will typically comprise data or other type of signal which can authenticate a device (and/or the user thereof).

In some embodiments, the security key 622 may comprise a public and/or private encryption key to provide confidentiality and integrity, utilizing a Public Key Infrastructure (PKI) to provide authentication and authorization.

In certain embodiments, the security key 622 will be transmitted from the first primary communication device 610 to the controller 440 for verification via the control link 614. In alternate configurations, the security key 622 may be transmitted from the controller 440 to the first primary communication device 610 for verification. In some embodiments, the security key 622 may be in the form of an alphanumeric password and may be communicated to the user of the first primary communication device 610 separately, for example via email or separate phone conversation, which the user may then input using the first primary communication device 610 for transmitting to the controller 440.

In addition to authenticating the first primary communication device 610 (and hence its permission to participate in the conference call), the security key 622 will also be configured to contain participation level data or otherwise correspond to a participation level for the conference call (or a segment thereof), and particularly with respect to the media link 616.

In some instances, a PIN ("personal identification number") or access code may be requested by and/or required to be received by the controller 440 in order for the conference call user to be fully authenticated and permitted to participate on the call. In such embodiments, the PIN or access code may be in the form of an alphanumeric string and may be communicated to the user of the first primary communication device 610 separately, for example via email or separate phone conversation, which the user may then input using the first primary communication device 610 for transmitting to the controller 440.

The various permitted participation levels may include the ability to (or restriction from) listen, and the ability to (or restriction from) speak, and combinations thereof. The participation levels may also involve the ability to (or restriction from) viewing and/or modifying multimedia, documents or other data. The participation levels may further involve moderator privileges, with the ability to control and regulate the privilege/participation level of other participants in the conference call. As will be understood, participation levels may also be varied or adjustable over time. In other words, a security key 622 may correspond to a participation level for a particular period of time, or may be set for the duration of the conference call unless otherwise changed (for example, by the moderator of the conference call); in such instances, the first identification data may comprise a plurality of security keys over the duration of the conference call.

By way of example, the first primary communication device 610 (and the corresponding user) may provide (or in some embodiments receive) a first security key 622 corresponding to a first participation level in which the user is permitted to speak on the conference call for a limited period. A subsequent second security key 622 may later be provided to the first primary communication device 610, which provides a second participation level, different from the first participation level, in which the user is restricted from speaking on the conference call. Such an arrangement might, for example, be used during a teleconference presentation having a number of "spectators" who are only permitted to speak during a designated question period.

By way of further example, a security key 622 might comprise the alphanumeric data string "123adqtalkyeslistenyes5min", with the "123adq" component functioning as a security identifier and with the "talkyeslistenyes" component thereof providing participation level data indicating that the device 610 is to be provided with both speaking and listening privilege in the conference call. The "5min" component of the example security key 622 might indicate that the security key 622 (and the corresponding participation level/communication privileges) will only last for the next 5 minutes, by which time a new security key 622 would need to be communicated.

The conference controller 440 is illustrated in FIG. 4 as residing on or otherwise operatively coupled to the LAN 410. In some embodiments, a corresponding conference client module 140 may be provided on the mobile device 100 and operatively coupled to the CPU 102 (and hence to the communication subsystem 104) and which contains suitable application programming or software code (sometimes referred to as a "client application") for interaction with the conference controller 440 to provide the conference call functionality.

While the conference controller 440 may directly control the media stream(s) 616 between participating devices 100 in a conference call and thereby regulate the privileges/functionality provided to the various devices 100, in some embodiments, the conference client 140 (through its interactions with the conference controller 440 via a control link) may enable or restrict the functionality (for example, the ability to speak or to listen) of the device 100 on which the conference client 140 is residing. Some conference call circumstances, for example in which a leg of a conference call anchors (and effectively acts as a 'portal' for) multiple users in daisy-chain fashion and introduced to the conference call via one or more secondary managed or unmanaged conference call circuits or bridges, provide challenges for a centralized conference controller to manage multiple privilege levels on a single leg. In such "daisy-chain" conference call situations, differing privilege levels may be accommodated on a single conference call leg by having each conference client 140 on a device 100 regulate the privilege level or functionality of the device 100 participating in a conference call.

Conference parameter data relating to the conference call to be established, may also be exchanged between the controller 440 and the first primary communication device 610 via the control link 614. For example, the conference parameter data may include the time of the conference call, and the invited parties and their corresponding contact "numbers" or communication device identifiers/product identification numbers. Information corresponding to the conference parameter data may be displayed on the display of the communication device 610 or otherwise communicated to the user of the device 610 (eg. via an auditory "display"). As will be understood, preferably the control link 614 will be established in such a way as to securely identify the first primary communication device 610 to the controller 440. For example, the controller 440 may obtain identification data from or otherwise utilize SIM 126 to authenticate (or partially authenticate) the device 610.

In some instances, the control link 614 may be initiated by the communication device 610, in order for the user of the communication device 610 to set up and commence a conference call. Alternatively, if the parameters of the conference call have been previously determined, the controller 440 may communicate with the communication device 610 to establish the control link 614 and take the other steps necessary to initiate the conference call in accordance with the previously determined conference call parameters, as discussed below.

A media link (as represented by line 616 in FIG. 6A) between the first and second primary communication devices 610, 612 via the conference call controller 440 may then be established (Block 519). As will be understood, the terms "via" or "between" in reference to links with "the conference call controller 440" are intended to refer broadly to situations in which the link or signal is operatively coupled to the controller 440, but also is intended to refer to situations in which the link is established by, but may not maintain a continuous connection to, the controller 440. In some embodiments, the controller 440 may be programmed or otherwise configured to initiate a first communication leg to the first primary communication device 610, such as by placing a telephone call to the first primary communication device 610 and to initiate a second communication leg to the second primary communication device 612, such as by placing a telephone call to the second primary communication device

612. The controller 440 may be configured to utilize the mobile devices' assigned MSISDN (Mobile Station Integrated Services Digital Network) number or assigned PIN number to initiate the communication legs. The two communication legs may then be linked by the controller 440.

While such media link 616 may comprise a standard voice stream or voice signal as may be established for typical voice telephony or other communications, as will be understood, the media link 616 may comprise other types of media data signals (for example, multimedia signals for multimedia presentations, or videophone applications). In some embodiments, preferably the media link 616 is encrypted, and in some implementations comprise a telecommunications link.

In some implementations, a second control link (as indicated by line 618 in FIG. 6A) may also be established between the conference call controller 440 and the second primary communication device 612 (Block 520). Such control link 618 may be in the form of a data signal in which conference parameter data relating to the conference call, may be exchanged between the controller 440 and the second primary communication device 612. Such control link 618 may also be established prior to the establishing of the media link 616 in Block 518.

As with control link 614, the control link 618 may be in the form of a data signal in which second identification data 624 may be communicated between the controller 440 and the second primary communication device 612 (Block 521). Such identification data 624 may comprise a security key 626 which may be authenticated. As noted previously, a security key will typically comprise data or other type of signal which can authenticate a device (and/or the user thereof).

In certain embodiments, the security key 626 will be transmitted from the second primary communication device 612 to the controller 440 for verification via the control link 618. In alternate configurations, the security key 626 may be transmitted from the controller 440 to the second primary communication device 612 for verification. In some embodiments, the security key 626 may be in the form of an alphanumeric password and may be communicated to the user of the second primary communication device 612 separately, for example via email or separate phone conversation, which the user may then input using the second primary communication device 612 for transmitting to the controller 440.

In addition to authenticating the second primary communication device 612 (and hence its permission to participate in the conference call), the security key 626 may also be configured to contain participation level data or otherwise correspond to a participation level for the conference call (or a segment thereof) and particularly with respect to the media link 616.

In some instances, a PIN ("personal identification number") or access code may be requested by and/or required to be received by the controller 440 in order for the conference call user to be fully authenticated and permitted to participate on the call. In such embodiments, the PIN or access code may be in the form of an alphanumeric string and may be communicated to the user of the second primary communication device 612 separately, for example via email or separate phone conversation, which the user may then input using the second primary communication device 612 for transmitting to the controller 440.

The various permitted participation levels may include the ability to (or restriction from) listen, and the ability to (or restriction from) speak, and combinations thereof. In some implementations, the participation levels may also involve the ability to (or restriction from) view and/or modify multimedia, documents or other data. As will be understood, participation levels may also be varied or adjustable over time. In other words, a security key 622 may correspond to a participation level for a particular period of time.

By way of example, the first primary communication device 610 (and the corresponding user) may provide (or in some embodiments receive) a security key 622 corresponding to a participation level in which the user is permitted to speak on the conference call for a limited period.

By way of further example, a security key 626 might comprise the alphanumeric data string "456zxwtalknolistenyes5min", with the "456zxw" component functioning as a security identifier and with the "talknolistenyes" component thereof providing participation level data indicating that the device 612 is to be provided with listening privilege, but restricted from speaking, in the conference call. The "5min" component of the example security key 626 might indicate that the security key 626 (and the corresponding participation level/communication privileges) will only last for the next 5 minutes, by which time a new security key 626 would need to be communicated. Of course, other security key configurations may be used for the various security keys 622, 626.

In embodiments in which multiple control links eg. 614, 618 are established between multiple communication devices 610, 612, one device 610, 612 may be provided with moderator privileges and in such instances, one control link (eg. second control link 618) may be designated as the moderator link 615. Typically, the intended moderators identity will be one of the parameters of the conference call data, and may by default be assigned to a communication device 610, 612 initiating the conference call (if appropriate). The communication device 612 having the moderator control link 615 may be provided with top level privileges and corresponding control over the conference call and amending its parameters, including for example, adding or removing parties as necessary or amending privilege levels, or even assigning/delegating the moderator privileges. So for example, if the communication device 612 having the moderator control link 615 assigns the moderator privileges to communication device 610, the control link 615 may shift to the first control link 614, thereby providing the user of the first primary communication device 610 with the moderator privileges to control the conference call.

Once the media link 616 has been established, users of the first and second primary communication devices 610, 612, may communicate with each other (consistent with any communication restrictions/privileges as discussed previously).

Referring now to FIG. 6B, consider a situation in which one or more participants of the conference call, for example, the user of the first primary communication device 610, desires to introduce another media stream for use in connection with the conference call. For example, the user(s) may wish to receive or present a drawing, a document or other multimedia presentation materials to one or more other participants of the conference call. Similarly, for example, the user(s) may wish to introduce a figure or document for one or other participants in the conference call to jointly draft or revise. One or more such participants may wish to link to such additional media stream, to view, revise or otherwise experience such additional material. Linking to and participating in such additional media stream may also require sufficient permission or participation levels, as will be understood.

A first alternate communication device 620 may be selected or otherwise provided. The user may decide to initiate a link request, in order to introduce the first alternate communication device 620 (such as computer 450 and/or white board 456) to the conference call. A conference call menu may be provided on the display 110 of the communication device 610. Such conference call menu will preferably be provided with the option for the user to add or otherwise link an additional communication device to the conference call, allowing the user to input or otherwise designate the proposed additional communication device (such as the first alternate communication device 620 illustrated in FIG. 6B). The link identification may comprise an MSISDN number, a mobile device PIN number, a PBX number, a PBX extension/access number or a URI (Uniform Resource Identifier as outlined in IETF rfc3986). A URI (e.g. a SIP URI) may also be used to help resolve the service the initiator is looking to invoke with the additional communication device. Such data identifying the additional communication device may be communicated to the controller 440 together with the link request, via the control link 614.

The link request may then be evaluated. For example, if the user of the communication device 610 has sufficiently high privilege levels, the controller 440 might be programmed or otherwise configured to permit and then initiate the link. Alternatively, the request may be routed by the controller 440 to the moderators communication device 612 via the moderators control link 615 and displayed on the device 612 display 110. The moderator may then grant or deny such link permission by inputting data (in some embodiments through the selection of menu options) which is received by the controller via the control link 615, 618. In such instances, a new security key may be generated providing such upgraded privilege as may be required to enable access.

If the link request is approved or granted, the controller 440 may then be configured to establish a second media link 622 between the first alternate communication device 620 and the conference call controller 440. In some embodiments, the controller 440 may be programmed or otherwise configured to initiate a communication leg to the first alternate communication device 620, such as by placing a telephone call to or otherwise contacting the first alternate communication device 620. As will be understood, the second media link 622 may convey a second media signal which is different than the first media signal conveyed by the first media link 616. For example, the first media link 616 may convey a voice stream signal, and the second media link 622 may convey a multimedia signal. In yet another example, both links 616, 622 may convey different multimedia signals. Other signal types and combinations are possible, as will be understood.

In similar fashion (to that outlined with respect to Blocks 521 to 530), the second media link 622 may also be extended by the controller 440 to a second alternate communication device 630 (such as computer 450 and/or white board 456). Such extension of the link 622 to the second alternate communication device 630 may be as a result of the controller 440 receiving a link request from the first primary communication device 610 via the first control link 615. Alternatively, the link 622 may be extended to the second alternate communication device 630 as a result of the controller 440 receiving a link request from the second primary communication device 612 via the second control link 618.

As will be understood, if the first and second alternate communication devices 620, 630 are each an embodiment of a mobile device 100, then the enterprise specific protocols for the LAN 410 may be used in establishing and extending the second media link 622 to the first and second alternate communication devices 620, 630. Alternatively, if the alternate communication device 620, 630 is a PBX type of communication device, then appropriate PBX protocols, such as H.323 transfer protocols, may be used to transfer the media link 616.

As will be understood, while two primary communication devices 610, 612 (and two alternate communication devices 620, 630) were illustrated and described as participating in the conference call, additional communication devices may also participate in the conference call.

As will also be understood, while the communication system and embodiments described herein have been illustrated as utilizing SIP, it should be understood that other protocols (including those which may be developed in the future) may be utilized for establishing and controlling sessions as contemplated herein. In addition to "other protocols" it is possible that some embodiments may utilize mediation layers (eg. JAIN/SIP or JAIN/CC) to establish and control sessions as contemplated herein. As well, other embodiments may utilize other signalling mechanisms, such as IMS, SS7, ISDN and H323.

The steps of the method of facilitating a conference call in accordance with any of the embodiments described herein may be provided as executable software instructions stored on computer-readable media, which may include transmission-type media.

The invention has been described with regard to a number of embodiments. However, it will be understood by persons skilled in the art that other variants and modifications may be made without departing from the scope of the invention as defined in the claims appended hereto.

The invention claimed is:

1. A method of facilitating a conference call between a plurality of communication devices, the method comprising:
    establishing a first control link between a first primary communication device and a conference call controller;
    communicating first identification data to authenticate the first primary communication device, between the first primary communication device and the conference call controller via the first control link, wherein the first identification data comprises at least one first security key; and
    establishing a media link between the first primary communication device and a second primary communication device via the conference call controller;
    wherein the at least one first security key is configured to contain participation level data indicating at least one participation level of the first primary communication device with respect to the media link.

2. The method as claimed in claim 1, further comprising:
    establishing a second control link between the second primary communication device and the conference call controller;
    communicating second identification data between the second primary communication device and the conference call controller via the second control link, wherein the second identification data comprises a second security key; and
    wherein the second security key establishes a participation level of the second primary communication device with respect to the media link.

3. The method as claimed in claim 1, wherein the identification data is communicated from the first primary communication device to the conference call controller.

4. The method as claimed in claim 1, wherein the participation levels comprise at least one selected from the group consisting of:
    listen; and
    speak.

5. The method as claimed in claim 1, wherein the first identification data comprises a plurality of security keys.

6. The method as claimed in claim 1, wherein the first participation level differs from the second participation level.

7. The method as claimed in claim 1, wherein the media link comprises a voice signal.

8. The method as claimed in claim 1, wherein the media link comprises a multimedia signal.

9. A non-transient computer-readable medium comprising instructions, when executed, cause a conference call controller perform a method, the method comprising:
- establishing a first control link between a first primary communication device and the conference call controller;
- communicating first identification data to authenticate the first primary communication device, between the first primary communication device and the conference call controller via the first control link, wherein the first identification data comprises at least one first security key; and
- establishing a media link between the first primary communication device and a second primary communication device via the conference call controller;
- wherein the at least one first security key is configured to contain participation level data indicating at least one participation level of the first primary communication device with respect to the media link.

10. A system for facilitating a conference call between a plurality of communication devices, the system comprising a conference call controller on which an application executes, wherein the application is programmed to perform a method, the method comprising:
- establishing a first control link between a first primary communication device and the conference call controller;
- communicating first identification data to authenticate the first primary communication device, between the first primary communication device and the conference call controller via the first control link, wherein the first identification data comprises at least one first security key; and
- establishing a media link between the first primary communication device and a second primary communication device via the conference call controller;
- wherein the at least one first security key is configured to contain participation level data indicating at least one participation level of the first primary communication device with respect to the media link.

11. A system for facilitating a conference call between a plurality of communication devices, the system comprising:
- a conference call controller configured to:
  - establish a first control link with a first primary communication device;
  - establish a media link between the first primary communication device and at least one second primary communication device;
- wherein the conference call controller and the first primary communication device are configured to communicate first identification data to authenticate the first primary communication device, between the first primary communication device and the conference call controller via the first control link, wherein the first identification data comprises at least one first security key; and
- wherein the at least one first security key is configured to contain participation level data indicating at least one participation level of the first primary communication device with respect to the media link.

12. The system as claimed in claim 11, wherein:
- the conference call controller is further configured to establish a second control link with the second primary communication device;
- wherein the conference call controller and the second primary communication device are further configured to communicate second identification data via the second control link, wherein the second identification data comprises a second security key; and
- wherein the second security key establishes a participation level of the second primary communication device with respect to the media link.

13. The system as claimed in claim 11, wherein the identification data is communicated from the first primary communication device to the conference call controller.

14. The system as claimed in claim 11, wherein the participation levels comprise at least one selected from the group consisting of:
listen; and
speak.

15. The system as claimed in claim 11, wherein the first identification data comprises a plurality of security keys.

16. The system as claimed in claim 11, wherein the first participation level differs from the second participation level.

17. The system as claimed in claim 11, wherein the first primary communication device comprises a portable communication device.

18. The system as claimed in claim 11, wherein the media link comprises a telecommunications link.

* * * * *

UNITED STATES PATENT AND TRADEMARK OFFICE
CERTIFICATE OF CORRECTION

PATENT NO. : 8,290,135 B2
APPLICATION NO. : 12/394164
DATED : October 16, 2012
INVENTOR(S) : Brian Oliver et al.

It is certified that error appears in the above-identified patent and that said Letters Patent is hereby corrected as shown below:

In the Specification:

In column 1, line 22, "capabilities a PDA," should read --capabilities, a PDA,--.

In column 1, line 36, "users enterprise" should read --user's enterprise--.

In column 3, line 30, "forward them" should read --forwards them--.

In column 7, line 17, "subscribers corresponding" should read --subscriber's corresponding--.

In column 7, line 21, "subscribers office" should read --subscriber's office--.

In column 12, line 53, "manufacturers PBX" should read --manufacturer's PBX--.

In column 13, line 7, "manufacturers gateway" should read --manufacturer's gateway--.

In column 13, line 16, "devices 110B, 100C." should read --devices 100B, 100C.--.

In column 13, line 25, "devices 110B, 100C," should read --devices 100B, 100C,--.

In column 13, line 26, "provide communication device" should read --provide the communication devices--.

In column 15, lines 10-11, "support access a single" should read --support access to a single--.

In column 20, line 28, "moderators identity" should read --moderator's identity--.

Signed and Sealed this
Twelfth Day of February, 2013

Teresa Stanek Rea
*Acting Director of the United States Patent and Trademark Office*

CERTIFICATE OF CORRECTION (continued)
U.S. Pat. No. 8,290,135 B2

In column 21, line 23, "moderators communication device" should read --moderator's communication device--.

In column 21, lines 23-24, "moderators control link" should read --moderator's control link--.

In the Claims:

In claim 9, column 23, lines 10-11, "controller perform" should read --controller to perform--.

In claim 12, column 24, line 24, before "the conference call controller" delete "wherein".